W. B. VAUGHAN.
METHOD OF HOLDING A NIPPLE, CUTTING THREADS ON THE OUTER END THEREOF, AND EXPANDING AND REMOVING THE BURS FROM THE OPPOSING ENDS OF A PIPE AND NIPPLE.
APPLICATION FILED NOV. 23, 1915.

1,199,637.

Patented Sept. 26, 1916.

Inventor
W. B. Vaughan,
By Victor J. Evans
Attorney

Witnesses

UNITED STATES PATENT OFFICE.

WILLIAM B. VAUGHAN, OF BINGHAMTON, NEW YORK.

METHOD OF HOLDING A NIPPLE, CUTTING THREADS ON THE OUTER END THEREOF, AND EXPANDING AND REMOVING THE BURS FROM THE OPPOSING ENDS OF A PIPE AND NIPPLE.

1,199,637.  Specification of Letters Patent.  Patented Sept. 26, 1916.

Application filed November 23, 1915. Serial No. 63,044.

*To all whom it may concern:*

Be it known that I, WILLIAM B. VAUGHAN, a citizen of the United States, residing at Binghamton, in the county of Broome and State of New York, have invented new and useful improvements in methods of holding a nipple, cutting threads on the outer end thereof, and expanding and removing the burs from the opposing ends of a pipe and nipple, of which the following is a specification.

This invention is an improved method of holding a nipple for cutting threads on the outer end thereof, and for also expanding and removing the burs from the opposing ends of a pipe and nipple, and consists in placing a nipple holder and pipe expander in and between the opposing ends of a pipe and nipple and in a pipe sleeve or coupling while screwing the nipple into the pipe sleeve as hereinafter described and claimed.

Figure 1:
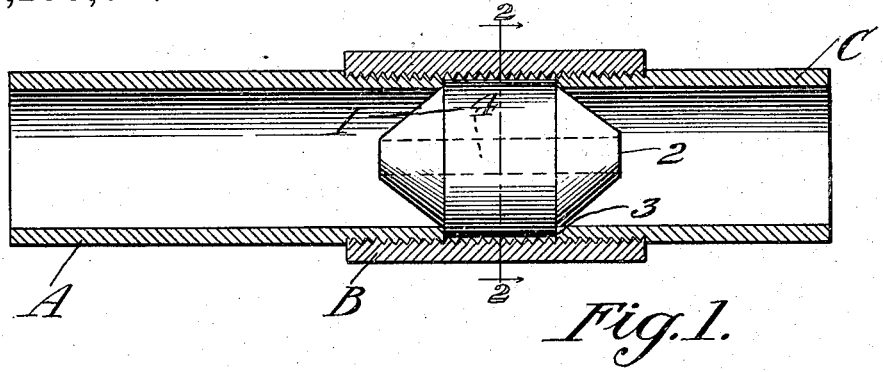
Figure 2:
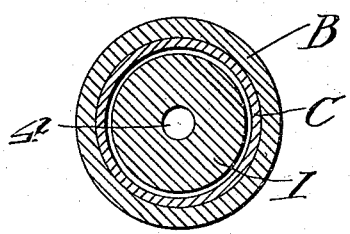
Figure 3:
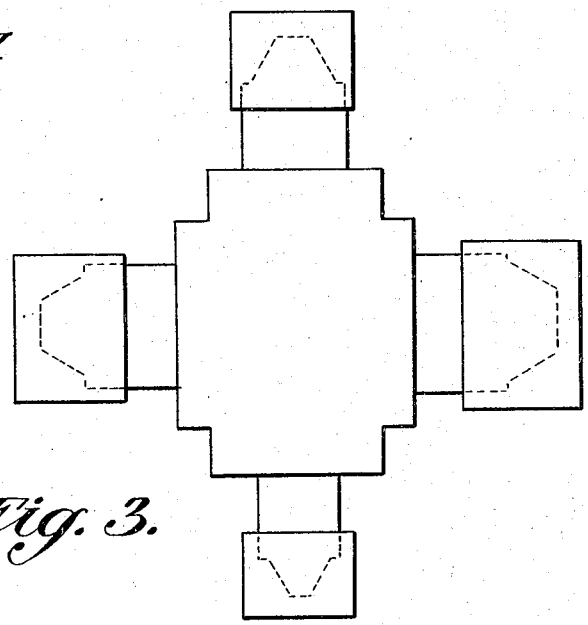

In the accompanying drawings: Figure 1 is a longitudinal sectional view of a pipe, a nipple, and a pipe sleeve or coupling and showing one of my improved nipple holders and pipe expanders in use therein, in accordance with my method. Fig. 2 is a detail sectional view of the nipple holder and pipe expander. Fig. 3 is a plan of a cross coupling adapted for use in connection with my improved nipple holders and pipe expanders.

The nipple holder and pipe expander comprises a cylindrical body 1 of suitable length and diameter, having conical ends 2 and annular shoulders 3 around the bases of the conical ends. The nipple holder and pipe expander is made of hardened steel or other suitable material. The ends thereof are here shown as truncated and the nipple holder and pipe expander is also here shown as provided with a central longitudinal bore 4.

The use of the improved nipple holder and pipe in accordance with my method is illustrated in Fig. 1 in which a pipe is indicated at A, a pipe sleeve or coupling is indicated at B and a nipple is indicated at C. The pipe A is secured in a suitable pipe vise and the sleeve or coupling B is screwed tightly on the end of the pipe A. The nipple holder and pipe expander is placed in the sleeve or coupling B and the nipple C is then screwed in the sleeve or coupling tightly and ready to be threaded. The nipple is too short to be held in a pipe vise and threaded on the outer end, but by screwing the same in the sleeve or coupling B, and causing the conical ends of the nipple holder and pipe expander to enter the opposing ends of the pipe and the nipple, the latter will be held tightly and securely by the coupling and nipple holder so that the outer end of the nipple may be threaded, and the conical ends of the nipple holder and pipe expander are also caused to expand and remove the burs from the opposing ends of the pipe and nipple, as caused by the operation of the pipe cutter in cutting the pipe and the nipple. After the nipple has been thus threaded at its outer end and the burs removed, the nipple then is unscrewed from the sleeve or coupling B by means of a pipe wrench, the nipple holder and pipe expander removed and the nipple again screwed in the sleeve or coupling.

The improved nipple holder and expander is a combination tool as it holds the nipple from turning in the coupling while the nipple is being threaded and at the same time expands the bur out of the end of the nipple. The device can also be used as an expander separately on end pieces of pipe that have to be cut into with a saw cutter, to remove the bur caused by the use of the saw and avoid the necessity of using a reamer for this purpose. By screwing a short piece of pipe, say three or four inches in a sleeve or coupling and placing the nipple holder and expander in this sleeve or coupling and then screwing the coupling on the end of any piece of pipe that has been threaded, the expander will operate to free the cut end of the pipe to its full area. The cross is arranged to have four sizes of pipe expanders on it and assembled on one unit. This makes it handy for use as a combination tool or an expander.

Having described the invention, what is claimed is:

The herein described process of holding a nipple, and also expanding the opposing ends of a pipe and nipple, and removing the burs therefrom, while threading the outer end of the nipple, and consisting in screwing a sleeve or coupling on one end of a pipe, placing a nipple holder and pipe expander, comprising a cylindrical body having conical ends and annular shoulders, around the bases of the conical ends, in said pipe sleeve or coupling, and then screwing a nipple in the outer end of said sleeve, or coupling, so as to cause the coupling ends of the holder and expander to enter the opposing ends of the pipe and nipple, expand and remove the burs from the pipe and nipple and also hold the latter so securely as to enable it to be threaded on the outer end.

In testimony whereof I affix my signature in presence of two witnesses.

WILLIAM B. VAUGHAN.

Witnesses:
 FRED EITOPENC,
 BERNICE BEERS.

Copies of this patent may be obtained for five cents each, by addressing the "Commissioner of Patents, Washington, D. C."